(12) United States Patent
Merati et al.

(10) Patent No.: US 11,155,455 B2
(45) Date of Patent: Oct. 26, 2021

(54) BEVERAGE VENDING MACHINE

(71) Applicant: CARIMALI S.P.A., Bergamo (IT)

(72) Inventors: Alessandro Merati, Chignolo d'Isola (IT); Massimo Pelletta, Chignolo d'Isola (IT); Paolo Angeleri, Chignolo d'Isola (IT); Marcello Coffetti, Chignolo d'Isola (IT)

(73) Assignee: CARIMALI S.P.A., Bergamo (IT)

( * ) Notice: Subject to any disclaimer, the term of this patent is extended or adjusted under 35 U.S.C. 154(b) by 0 days.

(21) Appl. No.: 16/756,955

(22) PCT Filed: Oct. 19, 2018

(86) PCT No.: PCT/IB2018/058153
§ 371 (c)(1),
(2) Date: Apr. 17, 2020

(87) PCT Pub. No.: WO2019/077576
PCT Pub. Date: Apr. 25, 2019

(65) Prior Publication Data

US 2020/0270114 A1    Aug. 27, 2020

(30) Foreign Application Priority Data

Oct. 19, 2017  (EP) .................................... 17197399
Dec. 19, 2017  (IT) ......................... 102017000146643

(51) Int. Cl.
*B67D 1/00*  (2006.01)
*B67D 1/08*  (2006.01)
*B67D 1/12*  (2006.01)

(52) U.S. Cl.
CPC ......... *B67D 1/0004* (2013.01); *B67D 1/0888* (2013.01); *B67D 1/0895* (2013.01); *B67D 1/1275* (2013.01); *B67D 1/1279* (2013.01)

(58) Field of Classification Search
CPC .. B67D 1/0004; B67D 1/0888; B67D 1/0895; B67D 1/1275; B67D 1/1279; A47J 31/4485
See application file for complete search history.

(56) References Cited

U.S. PATENT DOCUMENTS 9,474,408 B2 * 10/2016 Dollner ............... A47J 31/4489
10,078,792 B2 *  9/2018 Penna .................... A47J 31/521
(Continued)

FOREIGN PATENT DOCUMENTS

CN        1961690 A        5/2007
CN        104661572 A      5/2015
(Continued)

OTHER PUBLICATIONS

International Search Report dated Feb. 14, 2019 for PCT application No. PCT/IB2018/058153.
(Continued)

*Primary Examiner* — Vishal Pancholi
*Assistant Examiner* — Bob Zadeh
(74) *Attorney, Agent, or Firm* — Ohlandt, Greeley, Ruggiero and Perle, LLP

(57) ABSTRACT

Automatic beverage vending machine that has a milk supply circuit includes a cold milk tank, a variable speed milk pump, a steam generator, a milk heater, and an electronic milk control unit. The electronic milk control unit is electrically connected to the milk pump and to an air solenoid valve. The electronic milk control unit is configured to cause the milk supply circuit to deliver smooth or frothed, hot or cold milk. The electronic milk control unit is also configured to determine milk-related quantities including the type of cold milk contained in the cold milk tank, the temperature of the cold milk contained in the cold milk tank, the amount of foam to dispense, and the type of milk to dispense, and to (Continued)

control operation of the milk pump and of the air solenoid valve based on the determined milk-related quantities.

12 Claims, 4 Drawing Sheets

(56) References Cited

U.S. PATENT DOCUMENTS

| | | | | |
|---|---|---|---|---|
| 2010/0075007 | A1* | 3/2010 | Schindler | A47J 31/4485 |
| | | | | 426/474 |
| 2017/0262729 | A1* | 9/2017 | Penna | G06T 7/40 |
| 2019/0059638 | A1* | 2/2019 | Dees | A47J 31/4485 |
| 2020/0270114 | A1* | 8/2020 | Merati | B67D 1/1275 |

FOREIGN PATENT DOCUMENTS

| | | |
|---|---|---|
| DE | 202014010272 U1 | 2/2015 |
| EP | 303999 A2 | 2/1989 |
| EP | 1785074 A1 | 5/2007 |
| EP | 2294952 A1 | 3/2011 |
| EP | 3064104 A1 | 9/2016 |

OTHER PUBLICATIONS

Written Opinion dated Feb. 14, 2019 for PCT application No. PCT/IB2018/058153.
Chinese Office Action (with English translation) dated May 26, 2021 for Chinese Appl. No. 201880066435.2.

* cited by examiner

BEVERAGE VENDING MACHINE

CROSS REFERENCE TO RELATED PATENT APPLICATIONS

This application is a national stage application, filed under 35 U.S.C. § 371, of International Patent Application No. PCT/162018058153, filed on Oct. 19, 2018, which claims priority to European patent application No. 17197399.3 filed on Oct. 19, 2017 and Italian patent application No. 102017000146643 filed on Dec. 19, 2017, the entire content of each is incorporated herein by reference.

TECHNICAL FIELD OF THE INVENTION

The present invention relates to beverage vending machines, in particular to machines for preparing hot beverages from brewable substances brewed with pressurised hot water, such as coffee-based beverages, e.g., espresso coffee, instant coffee, long or fresh-brew coffee, etc., or tea-based beverages, and in particular to the electronic control of beverage vending machines aimed at allowing even personnel or users with no particular skill or expertise to produce beverages containing milk, and that are of high quality from both an organoleptic and aesthetic standpoint, namely that contain a right amount of milk and in which the top milk foam layer has an appropriate height and consistency.

STATE OF THE ART

As is known, beverage vending machines comprise an upper brewable substance storage area where a brewable substance storage unit is arranged, that comprises one or more containers that may be all filled with one and the same brewable substance or with different brewing substances, and that may be defined either by distinct containers or by separate compartments of a single container; an intermediate brewing area, where a brewing unit is arranged, that comprises one or more brewing groups configured to carry out either one and the same brewing process or different brewing processes, to produce either one and the same type of beverage or different types of beverage from the brewable substances contained in the containers and that may assume different forms, in particular powder, as in the case of coffee or milk, or powder and granules, as in the case of coffee, or leaves, as in the case of tea; and a lower beverage dispensing area, where a beverage dispensing unit is arranged to dispense beverages produced by the brewing unit, and comprising one or more beverage dispensing nozzles arranged so as to dispense one or different beverages into one or more distinct receptacles (glasses, cups, etc.).

Beverage vending machines further comprise a water supply circuit to supply hot or cold water to the brewing unit to produce brewed beverages, and a milk supply circuit to produce hot or cold, frothed or smooth milk to be added to brewed beverages or to produce only-milk beverages.

The milk supply circuit essentially comprises a cold milk tank, a milk pump, typically a variable speed pump, to draw from the cold milk tank an amount of milk appropriate for the beverage being prepared, and a milk frothing and heating group, in which the milk drawn from the cold milk tank may be selectively mixed with air, to froth the milk, and with steam, to heat the frothed or smooth milk to a desired temperature.

The air necessary to froth the milk may be supplied either upstream from the milk pump, so as to be sucked by the milk pump together with the milk drawn from the cold milk tank, so resulting in the cold milk being frothed in the milk pump, or downstream of the milk pump, directly in a frothing and heating member, along with the steam required to heat the milk, into which the milk is sucked by Venturi effect generated by the steam flow, which acts as a carrier. With the first technology, namely the provision of a milk pump, it is possible to froth both hot and cold milk, whereas with the second technology, namely exploiting the Venturi effect generated by the steam flow, it is only possible to froth hot milk.

The steam necessary to heat the milk and optionally to draw air by Venturi effect, necessary to froth the milk, is generated in a water heater of the water supply circuit or in a dedicated water boiler and is supplied to the milk frothing and heating member due to the pressure that the steam assumes in the water heater or in the water boiler.

EP 3 039 999 A1 discloses an apparatus for dispensing foamed or non-foamed milk with different foaming values, through suction of air from the outside and suction of milk from a container. The apparatus comprises a milk container, an air intake opened towards the outside, a suction pump, an electric motor for actuating the suction pump, a first duct connecting the air intake to the suction pump, a second duct dipping into the milk container and joined to the first duct upstream from the point at which the first duct is connected to the suction pump, a third duct connected to the delivery side of the pump and ending with a milk dispensing point. The apparatus further comprises a central control unit for controlling, based on a predetermined programme, the operating parameters of at least the electric motor of the suction pump. Finally, the apparatus comprises a continuous flow rate regulator inserted in the first duct, between the air intake and the joining point between the first and second ducts, the continuous flow rate regulator having the associated actuator member connected to the central control unit for its control.

OBJECT AND SUMMARY OF THE INVENTION

The Applicant has experienced that the beverage vending machines, although satisfactory in many aspects, generally require a complex calibration phase that is to be carried out by qualified skilled personnel and that is particularly burdensome with regard to the milk supply circuit in order to dispense beverages containing milk that are of high quality, both from an organoleptic and aesthetic standpoint, i.e., that contain the right amount of milk and in which the top milk foam layer has an appropriate height and consistency.

The object of the present invention is to provide an automatic beverage vending machine so improved as to allow the problems and limits indicated above to be at least partially overcome.

According to the present invention an automatic beverage vending machine is provided as claimed in the appended claims.

DETAILED DESCRIPTION OF PREFERRED EMBODIMENTS OF THE INVENTION

The present invention will now be described in detail with reference to the accompanying figures to allow a person skilled in the art to produce and use it. Various modifications to the embodiments described will be immediately evident to those skilled in the art and the generic principles described can be applied to other embodiments and applications without departing from the scope of protection of the present invention, as defined in the appended claims. Therefore, the present invention must not be considered limited to the embodiments described and illustrated, but must be accorded the broadest scope of protection in conformity with the principles and with the characteristics described and claimed herein.

Figure 1:
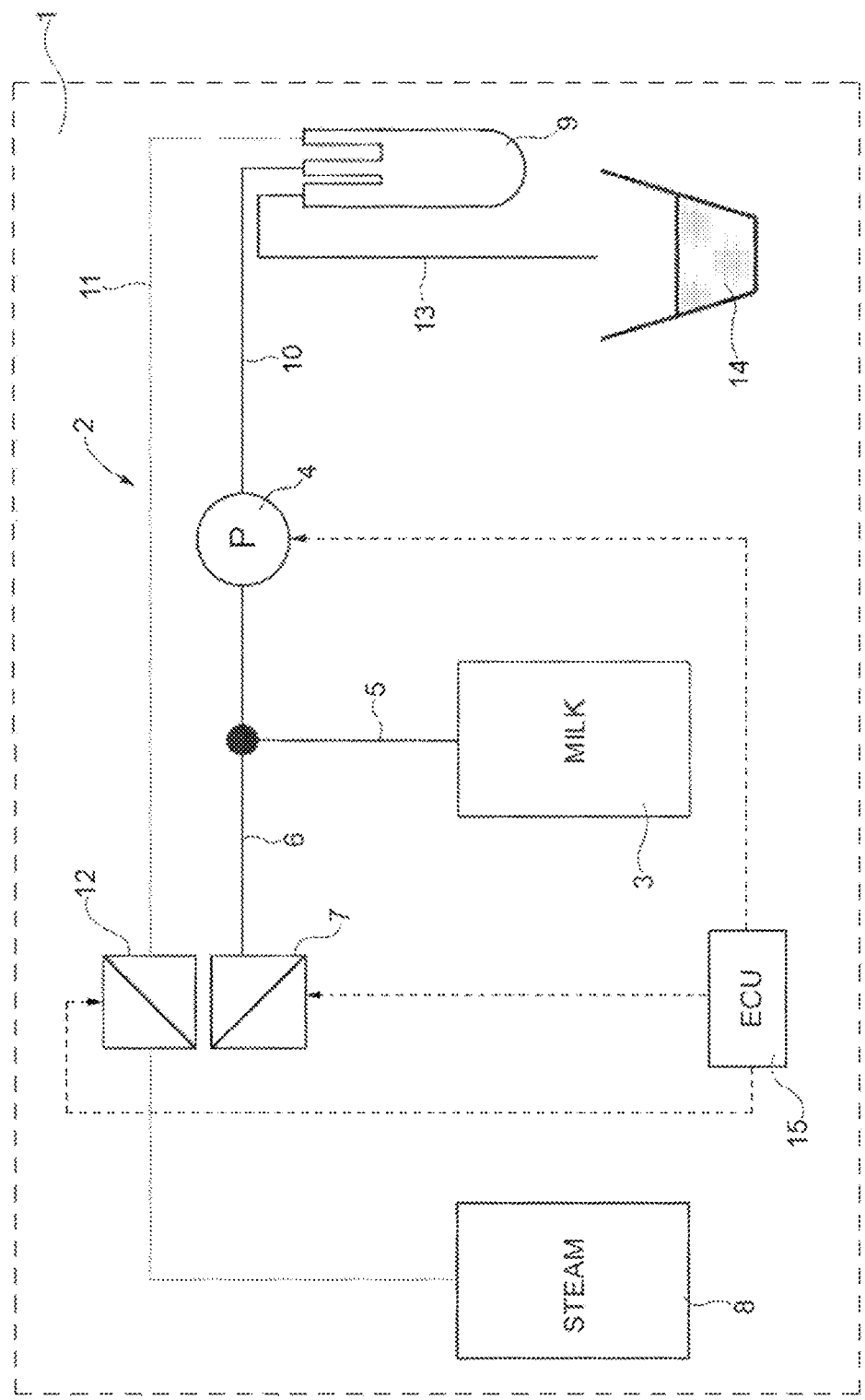
FIG. 1 shows a hydraulic diagram of a milk supply circuit in a beverage vending machine.

FIG. 1 schematically shows a milk supply circuit, referenced as a whole with reference numeral 1, in a beverage vending machine 1.

As shown in FIG. 1, the milk supply circuit 2 comprises:
a cold milk tank 3,
a variable speed milk pump 4 having a suction side fluidically connected to the cold milk tank 3 through a milk suction duct 5 to draw the milk contained therein, and to an air source (not shown) through an air supply duct 6 along which an air solenoid valve 7 is arranged, which is selectively operable, depending on the selected beverage, to supply the milk pump 4 with the amount of air required to froth the milk drawn out of the milk tank 3, and a delivery side through which smooth or frothed milk is delivered, depending on whether the milk pump 4 has been supplied with air,
a steam generator 8 having an inlet fluidically connected to a cold water source (not shown), which may be either a water container or mains water, through a water suction duct (not shown), and an outlet through which pressurized steam is delivered,
a milk heater 9 having a milk inlet fluidically connected to the delivery side of the milk pump 4 through a milk supply duct 10 to receive cold milk, enriched with air or not, from the milk pump 4, a steam inlet fluidically connected to the outlet of the steam generator 8 through a steam supply duct 11, along which a steam solenoid valve 12 is arranged, which is selectively operable, depending on the selected beverage, to supply the milk heater 9 with an amount of steam required to heat the cold milk, enriched with air or not, from the milk pump 4, and an outlet connected to a milk delivery duct 13, through which cold or hot, smooth or frothed milk is dispensed into a receptacle 14 (cup, glass, etc.) containing a beverage brewed by a brewing assembly of the beverage vending machine 1, and
an electronic milk control unit 15 electrically connected to the milk pump 4, the air solenoid valve 7, and the steam solenoid valve 12 to control operation of the milk pump 4, the air solenoid valve 7, and the steam solenoid valve 12 to cause the beverage vending machine 1 to produce beverages containing milk that are of high quality from both an organoleptic and an aesthetic standpoint, i.e., which contain the right amount of milk and in which the top milk foam layer has an appropriate height and consistency, regardless of the experience or the skill of the personnel responsible for calibrating the beverage vending machine 1.

The air supply duct 6 may be configured to supply the air solenoid valve 7 with an air flow coming either directly from the outside, optionally through an air filter, or from an air suction electric pump.

According to an aspect of the invention, the air solenoid valve 7 is an electronically-controlled servo-assisted valve capable of varying an air outflow section with extreme precision, thus allowing, together with the modulation of the speed of the milk pump 4, which results in a modulation of the milk flow rate of the milk pump 4, the amount and of the quality of the frothed milk to be adjusted as desired.

Figure 2:
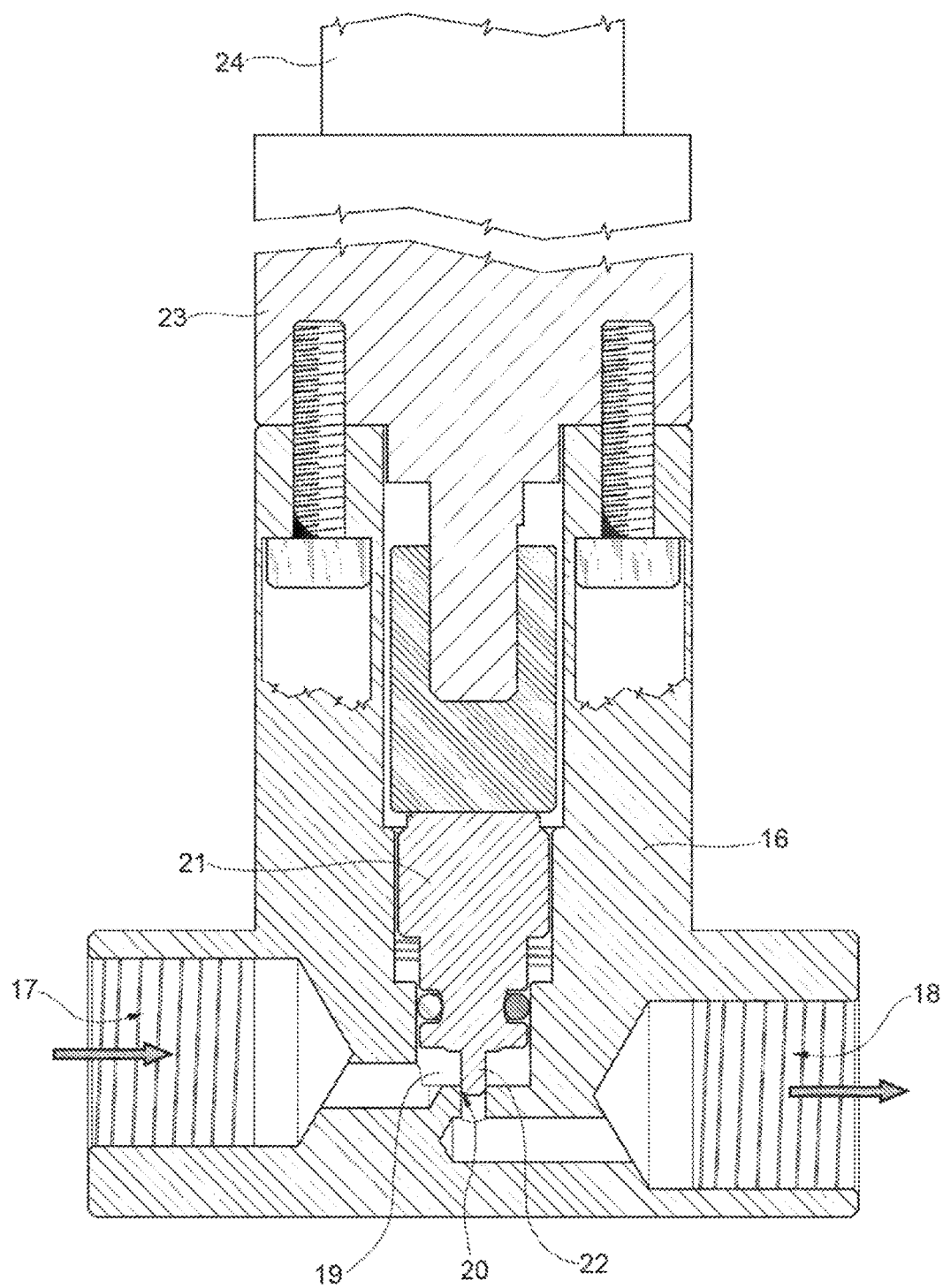
FIG. 2 shows the architecture of an air solenoid valve in the milk supply circuit.

In the embodiment shown in FIG. 2, the air solenoid valve 7 comprises:
a valve body 16 having an air inlet 17 fluidically connected to the air source (not shown) through an air suction duct (not shown), an air outlet 18 fluidically connected to the suction side of the milk pump 4 through the air supply duct 6, and an air chamber 19 in fluidic communication with the air inlet and outlet and defining a valve seal 20,
a shutter 21 housed in the valve body 16 and coupled thereto advantageously by means of a screw-lead screw, in which the screw is defined by a thread formed on the side surface of the shutter 21 and the lead screw is defined by a corresponding thread formed on the valve body 16, so resulting in the shutter 21 being able to slide axially so as to perform, starting from a closed position of the air solenoid valve 7, for dispensing cold or hot smooth milk, an opening stroke to an adjustable opening position of the air solenoid valve 7. The shutter 21 is provided with a pin 22 having a truncated-cone shaped tip adapted to engage the valve seat 20, so as to delimit, with the valve seat 20, an annular air outflow passage, the section of which increases progressively, advantageously continuously, along the opening stroke of the shutter 21, i.e., as the pin 22 moves away from the valve seat 20, thereby determining a greater air inflow into the milk drawn by the milk pump 4; and
a gear motor 23 mounted in the valve body 16, operatively coupled to the shutter 21, and electronically controllable by the electronic milk control unit 15 to rotate in opposite directions to cause the shutter 21 to perform opposite axial displacements along the opening and closing strokes in response to received electrical commands, so as to assume a series of programmable positions corresponding to different air outflow sections and, consequently, different degrees of opening/closing of the air solenoid valve 7 useful to produce the beverages that the beverage vending machine 1 is required to produce.

The gear motor 23 is also provided with a position sensor in the form of an encoder 24 to output an electrical position signal, typically a pulsed signal, hat allows the electronic milk control unit 15 to determine the position of the shutter 21 relative to the closed position, in which the pin 22 fluid-tightly engages the valve seat 20.

Figure 3:
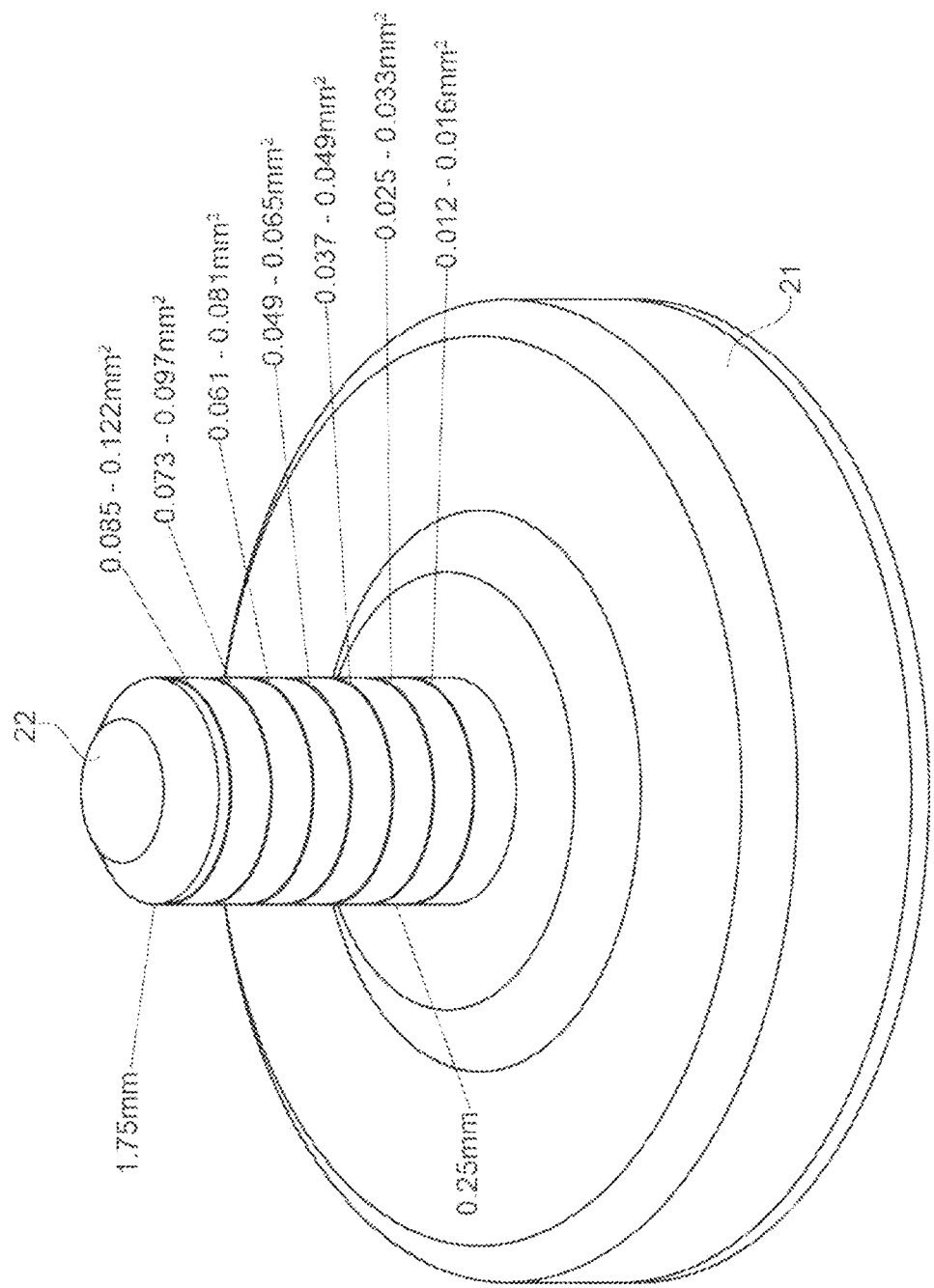
FIG. 3 shows different embodiments of a shutter pin of the air solenoid valve in FIG. 2.

FIG. 3 illustrates two different possible embodiments of the air solenoid valve 7, with indications of possible values of the programmable axial positions of the shutter 21 and of the corresponding air outflow sections for the production of different beverages.

In an alternative embodiment, the air solenoid valve 7 may be a commercial Electronic Flow Control (EFC) valve, such as the EFC-type Electronic Dispensing Valve manufactured by AVS-Römer, which is a valve provided with a precision throttle directly connected to a linear motor and with an electronic control system integrated in the valve housing and that allows the motor to be set up through an analogue voltage signal that allows a substantially continuous adjustment of the valve flow rate.

Figure 4:
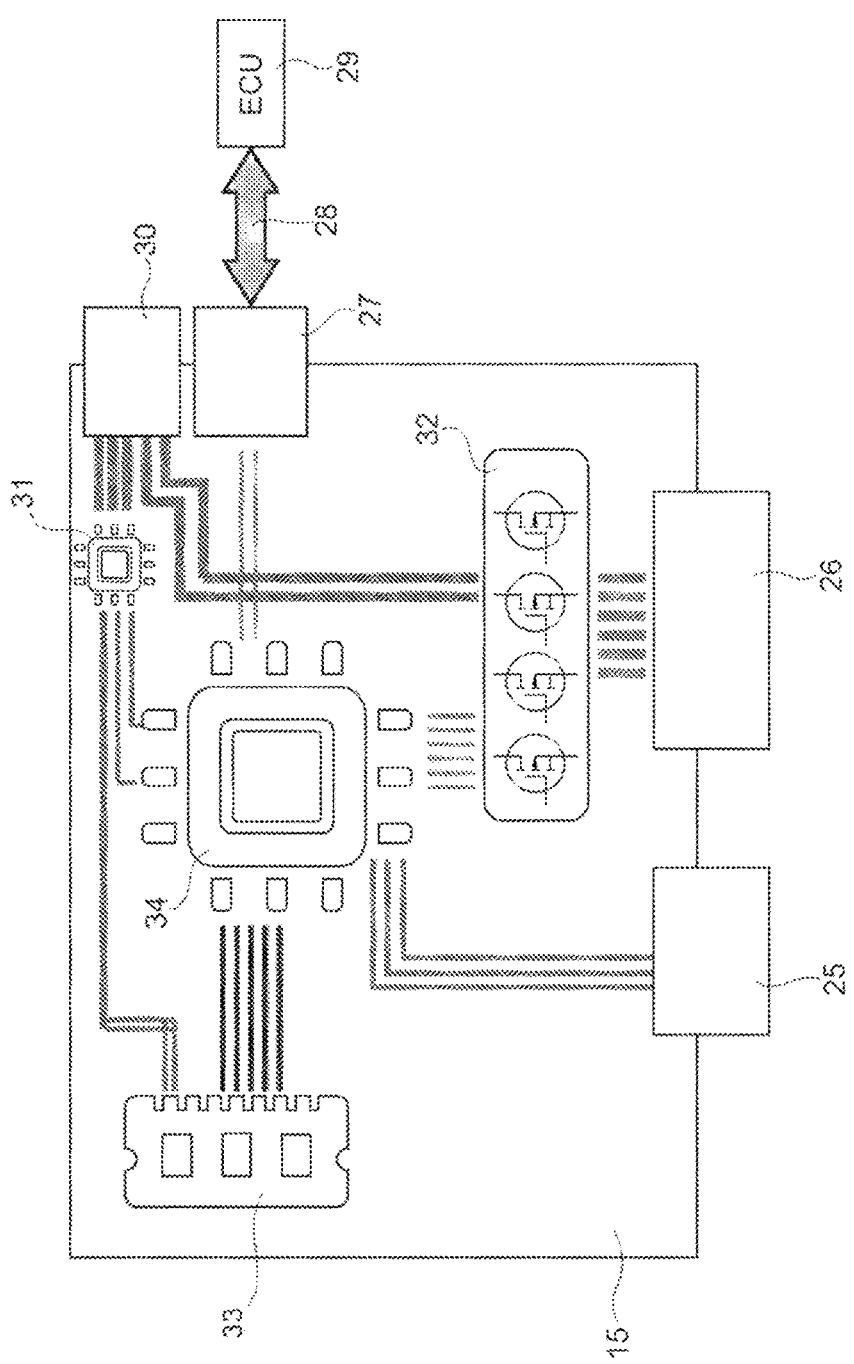
FIG. 4 shows a block diagram of an electronic milk control unit in the milk supply circuit.

As shown in FIG. 4, the electronic milk control unit 15 is advantageously in the form of an electronic printed circuit board comprising:

an input interface (connector) 25 for connection to the encoder 24, an output interface (connector) 26 for connection to the gear motor 23 and to the milk pump 4, a communication interface (connector) 27 for connection to a field bus-based communication network 28, through which the electronic milk control unit 15 may communicate with an electronic main control unit 29 of the beverage vending machine 1 and implement a master-slave architecture, in which the electronic milk control unit 15 is the slave electronic control unit and the electronic main control unit 29 is the master electronic control unit, an electric power supply interface (connector) 30 for connection to an external electrical power source for electrical power supplying the electric and electronic components on the electronic printed circuit board, to the gear motor 23, and to the encoder 24, a voltage stabilizer 31 connected to the electric power supply interface 30 to stabilize the electrical voltages supplied by the external electrical power source, a driver 32 to output electrical drive signals for the gear motor 23 and for the milk pump 4, a memory 33 to store data associated with the operation of the electronic milk control unit 15, and a microcontroller 34 electrically connected to the other electric and electronic components on the electronic printed circuit board and programmed to control operation of the milk pump 4 and of the gear motor 23 in response to electrical commands received from the electronic main control unit 29, in the manner described in more detail below.

In particular, the microcontroller 34 is programmed to:

receive from the electronic main control unit 29 electrical commands relating to the operation of the milk pump 4 and of the gear motor 23, and from the encoder 24 the electrical position signal indicative of the axial position of the shutter 21, and interpret and execute the electrical commands received from the electronic main control unit 29 to cause the driver 32 to responsively output, based on the electrical position signal supplied by the encoder 24 and on milk-related quantities described below, corresponding electrical drive signals for the milk pump 4 and for the gear motor 23.

Communication of the electronic milk control unit 15 with the electronic main control unit 29 allows implementation of various management and reading commands, among which:

initial positioning of the shutter 21, precise movement of the shutter 21 to the top position, precise movement of the shutter 21 to the top position, reading of the amplitude of the electrical current absorbed by the gear motor 23 during the initial reset step of the encoder 24, reading of the current position of the encoder 24, indication of faults detected during operation, setting of the duty-cycle of the pulse width modulated signal with which the gear motor 23 is moved, and performance of soft-start/soft-stop movements of the gear motor 23 for a greater positioning precision of the shutter 21.

According to a further and different aspect of the invention, the electronic milk control unit 15 is programmed to control the air outflow section of the air solenoid valve 7 and the speed of the milk pump 4 so as to automatically balance the different organoleptic and aesthetic performances that the different types of milk allow to achieve in the different beverages that may be produced by the beverage vending machine 1 when the amount of air supplied into the milk to froth it is varied, To do this, the electronic milk control unit 15 is programmed to produce a so-called closed-loop, self-regulating expert system capable of finding the optimal pre-set and of controlling the operation of the milk pump 4 and of the air solenoid valve 7 accordingly to produce beverages containing milk that are of high quality from both an organoleptic and aesthetic standpoint, i.e., which contain the right amount of milk and in which the top milk foam layer has an appropriate height and consistency, maintaining its performance stable over time.

For this purpose, the electronic milk control unit 15 is programmed to determine and control the operation of the milk pump 4 and of the air solenoid valve 7 at least based on the following milk-related quantities:

type of cold milk contained in the cold milk tank 3, which is an information settable by an operator during filling of the cold milk tank 3, choosing it between a plurality of pre-defined types available, such as whole milk, semi-skimmed milk and skimmed milk, or roughly choosing the generic type of milk and then manually entering the specific parameters of an unmapped particular milk, for example a New Zealand milk that differs from the most commonly available basic types, and temperature of the cold milk contained in the cold milk tank 3, which is an information that may be either supplied by a specific temperature sensor provided in the cold milk tank 3 and acquired autonomously by the electronic milk control unit 15, if programmed for this purpose, or, alternatively, in those beverage vending machines 1 in which the electronic milk control unit 15 is not programmed to acquire this information autonomously, but in which the temperature of the milk in the cold milk tank 3 supplied by the temperature sensor is only display on a display of the beverage vending machine 1, entered manually by an operator in the electronic milk control unit 15 by using a menu displayed on a display of the beverage vending machine 1, after having read it on the display.

For the same purpose, the electronic milk control unit 15 is further advantageously programmed to determine and control the operation of the milk pump 4 and of the air solenoid valve 7 also based on one or both the following additional milk-related quantities:

amount of foam to be dispensed (low, medium, high), that is an information that may be contained in stored recipes of the beverages that may be dispensed by the beverage vending machine 1 and may therefore be automatically read from the stored recipes, or that may be selected by a user of the beverage vending machine 1, type of milk to be dispensed (cold smooth, cold frothed, hot smooth, hot frothed), that is an information that may be contained in stored recipes of the beverages that may be dispensed by the automatic machine 1 and may therefore be automatically read from the stored recipes.

For this purpose, the electronic milk control unit 15 is programmed to:

receive from the electronic main control unit 29, electrical commands relating to operation of the milk pump 4 and of the gear motor 23, and from the encoder 24 the electrical position signal indicative of the axial position of the shutter 21, interpret and execute the electrical commands received from the main electronic control unit 29 to responsively output, based on the electrical position signal supplied by the encoder 24 and on the aforesaid milk-related quantities, corresponding Pulse Width Modulated (PWM) electrical drive signals for the milk pump 4 and for the gear motor 23, so as to adjust, on the one hand, the speed of the milk pump 4 and, consequently, the flow rate of the milk delivered by the milk pump 4, and, on the other hand, the speed and the positioning precision of the shutter 21, so as to obtain the temperature of the milk and the amount and the quality of the milk foam desired in the dispensed beverages.

The electronic milk control unit 15 is further programmed to output, in response to electrical commands received from the electronic main control unit 29, electrical drive signals for the gear motor 23 so as to adjust the texture of the frothed milk in the dispended beverages, eliminating the larger air bubbles therein.

For this purpose, the electronic milk control unit 15 is programmed to output electrical drive signals for the gear motor 23 to cause the shutter 21 to firstly assume the closed position, and then to be progressively moved to the opening position necessary to produce the type of foam desired as a function of the selected beverage, and then to be progressively moved, towards the end of dispensing, to the closed position so as to compact the surface of the foam and reduce the large air bubbles.

The movements and the positions the shutter 21 is required to assume represent an important aspect in order to obtain a yield of the finished product that satisfies the expected requirements and therefore are made so as to be as sure as possible of reaching these.

From an implementing standpoint, it is therefore advantageous to use a type of encoder 24 that outputs an electrical position signal having a wide range, for example from 0 to 5000 pulses, when the shutter 21 moves between the closed and open positions, so as to make it possible to identify among these those corresponding to a different qualitative yield of the milk.

In the example considered above, the duty-cycle of the PWM drive signal supplied to the gear motor 23 may thus be suitably selected to cause the encoder 24 to output an electrical position signal having a certain number of pulses, for example 10, between a programmed axial position of the shutter 21 and an adjacent programmed one, previous or subsequent, so as to be able to define 500 possible positions in the operating area of the air solenoid valve 7.

The shutter 21 is moved by means of an automatic soft-start/soft-stop motion mechanism of the gear motor 23 that causes accelerations and decelerations to be created to increase the accuracy of the position reached. This mechanism can also be used to generate opening and closing ramps to improve the final result.

The initial positioning of the shutter 21 is an important function to be able to identify with certainty a known position from which to then be positioned correctly. This known position is reached following a reset cycle based on precise movements that refer to the electric current absorption at an exact closing height. The reset cycle may be executed either automatically, when the beverage vending machine 1 is switched on, or on command, depending on the operator's needs. After reaching this known position, the count of the encoder 24 is reset and the shutter 21 is caused to return to the assigned and/or stored target position.

Finally, the electronic milk control unit 15 is programmed to determine and periodically transmit the general operating status of the beverage vending machine 1 to the electronic main control unit 29 so that this can be aware of any breakages or faults indicated.

For example, failed resets, failed reaching of the target positions or abnormal current absorptions linked to mechanical/electrical faults may be signalled.

The operating status of the beverage vending machine 1, in the position indicated by the encoder 24, may then be used to obtain functional feedback during the beverage dispensing cycles.

The invention claimed is:

1. A beverage vending machine having a milk supply circuit, the beverage vending machine comprising:
    a cold milk tank;
    a variable speed milk pump having a suction side fluidically connected to the cold milk tank through a milk suction duct to draw cold milk out of the cold milk tank, and to an air source through an air supply duct along which an air solenoid valve is arranged to cause the milk pump to be selectively supplied with air to froth the cold milk drawn out of the cold milk tank, and a delivery side through which smooth or frothed cold milk is delivered, depending on whether the milk pump has been supplied with air;
    a steam generator to produce steam;
    a milk heater having a milk inlet fluidically connected to the delivery side of the milk pump through a milk delivered supply duct to receive cold milk, a steam inlet fluidically connected to an outlet of the steam generator through a steam supply duct along which a steam solenoid valve is arranged to cause the milk heater to be selectively supplied with the steam to heat the cold milk received from the milk pump, and a milk outlet through which the cold or hot, the smooth or frothed milk is delivered, depending on whether the milk pump has been supplied with air, and the milk heater has been supplied with the steam; and
    an electronic milk control unit electrically connected to the milk pump and the air solenoid valve to control operation of the milk pump and of the air solenoid valve to cause the milk supply circuit to deliver the smooth or frothed, the hot or cold milk,
    wherein the electronic milk control unit is configured to:
    determine milk-related quantities comprising: type of the cold milk in the cold milk tank, temperature of the cold milk in the cold milk tank, and control operation of the milk pump and of the air solenoid valve based on the determined milk-related quantities and
    determine an amount of foam to be dispensed, a type of cold milk to be dispensed, and a control operation of the milk pump and of the air solenoid valve based on the determined additional milk-related quantities.

2. Software loadable in the electronic milk control unit of the beverage vending machine according to claim 1, wherein the software is configured to cause, when executed, the electronic milk control unit to determine the milk-related quantities and control the operation of the milk pump and of the air solenoid valve based on the determined milk-related quantities.

3. The beverage vending machine of claim 1, wherein the cold milk is enriched with the air.

4. The beverage vending machine of claim 1, wherein the air solenoid valve is an electronically-controlled, servo-assisted valve comprising:
    a valve body having an air inlet, an air outlet, and an air chamber in fluid communication with the air inlet and the air outlet and defining a valve seat,
    a movable shutter housed in the valve body to perform, starting from a valve closed position, in which the shutter is fluid-tightly coupled to the valve seat and closes the air solenoid valve, an opening stroke to reach different valve opening positions corresponding to different air outflow sections of the air solenoid valve; and a gear motor mounted in the valve body, operatively coupled to the shutter, and electronically controllable by the electronic milk control unit to rotate in opposite directions to cause the shutter to perform opposite axial displacements along the valve opening and closing strokes in response to received electrical commands to assume said different valve opening positions of the air solenoid valve, wherein the gear motor is provided with a position sensor to output an electrical position signal to allow the electronic milk control unit to determine the position of the shutter relative to the closed position.

5. The beverage vending machine of claim 4, wherein the shutter comprises a pin having a truncated-cone shaped tip that delimits, with the valve seat, an annular air outflow passage, the section of which increases progressively along the opening stroke of the shutter at said valve opening positions of the air solenoid valve.

6. A beverage vending machine having a milk supply circuit, the beverage vending machine comprising:

a cold milk tank;

a variable speed milk pump having a suction side fluidically connected to the cold milk tank through a milk suction duct to draw cold milk out of the cold milk tank, and to an air source through an air supply duct along which an air solenoid valve is arranged to cause the milk pump to be selectively supplied with air to froth the cold milk drawn out of the cold milk tank, and a delivery side through which smooth or frothed cold milk is delivered, depending on whether the milk pump has been supplied with air;

a steam generator to produce steam;

a milk heater having a milk inlet fluidically connected to the delivery side of the milk pump through a milk delivered supply duct to receive cold milk, a steam inlet fluidically connected to an outlet of the steam generator through a steam supply duct along which a steam solenoid valve is arranged to cause the milk heater to be selectively supplied with the steam to heat the cold milk received from the milk pump, and a milk outlet through which the cold or hot, the smooth or frothed milk is delivered, depending on whether the milk pump has been supplied with air, and the milk heater has been supplied with the steam; and an electronic milk control unit electrically connected to the milk pump and the air solenoid valve to control operation of the milk pump and of the air solenoid valve to cause the milk supply circuit to deliver the smooth or frothed, the hot or cold milk, wherein the electronic milk control unit is configured to:

determine milk-related quantities comprising: type of the cold milk in the cold milk tank, temperature of the cold milk in the cold milk tank, and control operation of the milk pump and of the air solenoid valve based on the determined milk-related quantities, wherein the air solenoid valve is an electronically-controlled, servo-assisted valve comprising:

a valve body having an air inlet, an air outlet, and an air chamber in fluid communication with the air inlet and the air outlet and defining a valve seat;

a movable shutter housed in the valve body to perform, starting from a valve closed position, in which the shutter is fluid-tightly coupled to the valve seat and closes the air solenoid valve, an opening stroke to reach different valve opening positions corresponding to different air outflow sections of the air solenoid valve; and a gear motor mounted in the valve body, operatively coupled to the shutter, and electronically controllable by the electronic milk control unit to rotate in opposite directions to cause the shutter to perform opposite axial displacements along the valve opening and closing strokes in response to received electrical commands to assume said different valve opening positions of the air solenoid valve, wherein the gear motor is provided with a position sensor to output an electrical position signal to allow the electronic milk control unit to determine the position of the shutter relative to the closed position.

7. The beverage vending machine of claim 6, wherein the shutter comprises a pin having a truncated-cone shaped tip that delimits, with the valve seat, an annular air outflow passage, the section of which increases progressively along the opening stroke of the shutter at said valve opening positions of the air solenoid valve.

8. The beverage vending machine of claim 6, wherein the electronic milk control unit is further configured to: receive from an electronic main control unit of the beverage vending machine, through a field bus-based communication network, commands relating to the operation of the milk pump and of the air solenoid valve, receive the electrical position signal from the position sensor, and interpret and execute the received commands to responsively generate, based on the milk-related quantities and on the electrical position signal, electrical drive signals for the milk pump and the air solenoid valve.

9. The beverage vending machine of claim 8, wherein the electronic milk control unit is further configured to: output, in response to electrical commands received from the electronic main control unit, electrical drive signals for the gear motor so as to adjust a texture of the frothed milk in a dispensed beverage.

10. The beverage vending machine of claim 9, wherein the electronic milk control unit is further configured to adjust the texture of the frothed milk in the dispensed beverage by generating the electrical drive signals for the gear motor so as to cause the shutter to first assume the closed position, then to perform an opening stroke to progressively move to a position corresponding to the texture of the cold milk to be obtained in the dispensed beverage, and then to perform a closing stroke to return to the closed position so as to compact a surface of the foam of the cold milk and reduce or eliminate larger air bubbles.

11. The beverage vending machine of claim 8, wherein the electronic milk control unit comprises an electronic printed circuit board comprising:

an input interface for connection to the position sensor, an output interface for connection to the gear motor and to the milk pump, a communication interface for connection to the field bus-based communication network, an electrical power supply interface for connection to an external electrical power source for electrical power supplying the components on the electronic printed circuit board, the gear motor, and the position sensor, a driver to output electrical drive signals for the gear motor and for the milk pump, a memory to store data associated with the operation of the electronic milk control unit, and a microcontroller electrically connected to the other components on the electronic printed circuit board and programmed to control the operation of the milk pump and of the gear motor in response to electrical commands received from the electronic main control unit.

12. Software loadable in the electronic milk control unit of the beverage vending machine according to claim 6, wherein the software is configured to cause, when executed, the electronic milk control unit to determine the milk-related quantities and control the operation of the milk pump and of the air solenoid valve based on the determined milk-related quantities.

\* \* \* \* \*